United States Patent [19]

Jumentier et al.

[11] 3,830,638

[45] Aug. 20, 1974

[54] APPARATUS FOR MANUFACTURE OF PLATES OR SHAPED SHEETS HAVING A BASE OF MINERAL FIBERS, PARTICULARLY GLASS FIBERS

[75] Inventors: Claude Jumentier, La Celle Saint Cloud; Alain Bonnet, Clermont, both of France

[73] Assignee: Certain-Feed Products Corporation, Valley Forge, Pa.

[22] Filed: Jan. 5, 1973

[21] Appl. No.: 321,344

Related U.S. Application Data

[62] Division of Ser. No. 100,750, Dec. 22, 1970, abandoned, which is a division of Ser. No. 726,706, May 5, 1969, Pat. No. 3,616,030.

[30] Foreign Application Priority Data
May 11, 1967  France .......................... 67.106046

[52] U.S. Cl............................. 65/14, 65/3, 65/11 R, 65/16, 118/308, 118/315, 118/316
[51] Int. Cl............................................. C03b 37/04
[58] Field of Search ........... 118/308, 310, 314, 315; 65/2, 3, 9, 11 R, 8; 264/121

[56] References Cited
UNITED STATES PATENTS

| | | | |
|---|---|---|---|
| 1,695,123 | 12/1928 | Poston ............................ | 118/310 X |
| 1,765,026 | 6/1930 | Miller ............................... | 65/3 |
| 2,336,946 | 12/1943 | Marden et al. ................. | 118/308 X |
| 2,466,906 | 4/1949 | Miller ............................ | 118/310 X |
| 2,543,251 | 2/1951 | Muench ......................... | 118/310 X |
| 3,282,667 | 11/1966 | Stalego et al. ................. | 65/8 |
| 3,337,669 | 8/1967 | Shannon et al. ................ | 264/121 |
| 3,338,996 | 8/1967 | Harris ............................. | 65/9 X |

*Primary Examiner*—Robert L. Lindsay, Jr.
*Attorney, Agent, or Firm*—Samuel Lebowitz

[57] ABSTRACT

The invention contemplates the homogeneous distribution of hard granules or particles throughout a mass of resin-coated mineral fibers to produce structural units in the form of sheets or slabs composed of the mass of mineral fibers in lattice-work form, particularly glass fibers, agglomerated with the dried and cured resin binder and having interspersed in the meshes of the mass, the separate hard and indeformable particles, either in solid form, such as sand, or in porous form, such as parlite or vermiculite, which render the structural units strongly resistant to physical deformation while enhancing the heat-insulating characteristics thereof.

12 Claims, 17 Drawing Figures

PATENTED AUG 20 1974 3,830,638

INVENTORS
CLAUDE JUMENTIER
ALAIN BONNET

BY
ATTORNEY

INVENTORS
CLAUDE JUMENTIER
ALAIN BONNET
BY
*Samuel Blum*
ATTORNEY

INVENTORS
CLAUDE JUMENTIER
ALAIN BONNET

APPARATUS FOR MANUFACTURE OF PLATES OR SHAPED SHEETS HAVING A BASE OF MINERAL FIBERS, PARTICULARLY GLASS FIBERS

This is a division of application Ser. No. 100,750, filed Dec. 22, 1970, now abandoned which is a division of application Ser. No. 726,706, filed May 5, 1968, now U.S. Pat. No. 3,616,030.

The invention relates to the production of plates or sheets shaped from a mass of mineral fibers, particularly glass fibers, agglomerated by a binding agent, which present at the same time both a high insulating capacity as well as a high degree of indeformability. According to one characteristic of the invention, these plates or shaped sheets are constituted by a latticework or network of fibers which are joined to each other by a binder and by solid and indeformable particles in the form of unitary granules which are interlocked and encompassed separately in the meshes of the fiber network and distributed in a homogeneous fashion therein.

It is another characteristic of the invention that the particles which are employed are at the same time hard, whole and indeformable, while being either solid or porous.

It has been determined that while the products of the invention present a very low tendency to deformation, particularly compression, they retain strongly the high heat-insulating capacity inherent in the porous structure of a mass of mineral fibers. This preservation of the high insulating quality is due to the fact that the hard particles or granules are in contact with the fibers of the meshes which encompass them only along points or lines of slight length, and thus there is practically no formation of thermal conducting paths or bridges between the particles and the fibers.

The high degree of indeformability of the products of the invention arises from the fact that each particle impedes the local deformation of the network in which it is enclosed, and that by reason of the homogeneous distribution of the particles in the entire mass, the deformation of the whole of the mass is prevented by the presence of all of these particles.

In a general way, it is possible to select the average granulometry of the particles which are used, as a function of the volumetric mass which is related to the mass of fibers. In all cases, the size of the particles or granules should be such that they are enclosed within the meshes of the network formed by the fibrous mass. If these meshes are very fine, small granules or particles of light granulometry are used; if the meshes are large, particles of larger dimensions may be used.

According to one embodiment of the invention, the fibers constituting the network may have a mean diameter between 3 microns and 16 microns; the apparent volume-mass characteristic or density of this fibrous mass may range between 25 Kg. and 200 Kg. per cubic meter, and preferably between 35 Kg. and 100 Kg. per cubic meter; the granulometry of the solid, whole, indeformable particles may be of the order of 0.10 mm. to 0.6 mm. and the proportion by volume of the mass of particles may be of the order of 2 to 20 percent, and preferably 3 to 15 percent of the total volume of the product.

According to another embodiment of the invention, the apparent volume-mass characteristic or density of the fibrous network may range between 35 Kg. and 100 Kg. per cubic meter, and the particles enclosed in the meshes of this network may be constituted by grains of sand of a granulometry of the order of 0.10 mm. to 0.40 mm.

Instead of sand, other solid particles may be used, for example, crushed glass, crushed rock, melted coal ashes, etc. The condition which these particles must always meet being that they are hard and indeformable.

Another improvement results from the use of hard and indeformable granules which include empty spaces. Advantageous characteristics are imparted to the structural units of the invention by the use of hard porous or foamed mineral particles, such as perlite or vermiculite. The products resulting from the use of such components are characterized by extremely light weight, high insulating capacity and a high degree of indeformability.

When use is made of fibrous masses having a slightly elevated specific density, the presence of these particles therein, particularly perlite, result in products which evidence a strong resistance to deformation, particularly compression.

In the modes of execution of the invention with hard porous granules, the constituent fibers of the network may have a mean diameter ranging between 3 microns and 16 microns, the apparent volume-mass characteristic or density of this network may range between 8 Kg. and 80 Kg. per cubic meter, preferably between 8 Kg. and 50 Kg. per cubic meter, with the granulometry of the granules being above 0.1 mm., and preferably between 0.5 mm. and 5 mm., and the proportion in volume of the mass of particles being of the order of 3 to 80 percent, and preferably between 10 and 50 percent of the total volume of the product.

The quantity of particles which is used per unit of volume of the final product depends on the density of the product and the mechanical properties which are sought to be attained. To obtain identical mechanical properties, for example, identical resistance to crushing under load, it is desirable that the proportion of particles be greater as the quanity of constituent fibers per unit of volume is lower. Otherwise, for a like quantity of fibers per unit of volume, the greater proportion of granules results in a higher degree of mechanical resistance.

It is the object of the invention to provide a method of producing structural units in the form of plates or shaped sheets of high insulating capacity and indeformability, as described above. This method consists in introducing the hard and indeformable particles, either in solid or porous form, throughout the mass of fibers in homogeneous fashion, by flowing the particles and projecting them into the mass of fibers which is treated with a binding agent, by the action of a gaseous current, and by then reducing the volume of said mass in such a way that the particles are completely enclosed and interlocked between the fibers after the binder sets. The reduction of volume may be effected advantageously by exerting a suction effect through the mass of fibers.

As a variation, the method may also be executed by introducing all or part of the binder together with the solid or porous granules or particles, into the mass of fibers. Thereby a better distribution of the binder within the network of fibers is obtained. It has been determined that the binder introduced with the particles moves from the surfaces of the particles towards the fibers and assures the joining of these fibers at their crossing points without the binder remaining in contact between particles and fibers, thereby avoiding all thermal bridges between them.

In accordance with the invention, provision is made to vary the quantity of granules or particles introduced into the mass of fibers, which may be varied in dependence upon the mechanical characteristics sought to be imparted to the product.

The invention contemplates many different devices for executing the procedures described above. These devices comprise a distributor, wherefrom the particles flow by gravity, and members, such as blowing nozzles, for producing gas jets, which act on the particles to project them into the mass of fibers and distribute them homogeneously in the latter.

According to one embodiment of the apparatus, the projection of particles takes place on one side of the mass of fibers.

According to another embodiment of the invention, the distributor and blower members are arranged around the mass of fibers issuing from the production apparatus, and there is provided, under the blower members, an oscillating nozzle or conduit into which passes the mass of fibers with the particles which have been incorporated in it. The oscillations of the nozzle or conduit make possible the regular distribution of fibers on the cloth or other receiving surface onto which the mass is projected for the formation of a mat or sheet.

It is the particular objective of the arrangements in accordance with the invention to secure an effective homogeneous distribution of the particles in the mass of fibers. This may be attained by introducing the granules or particles into the gaseous currents in the form of a sheet of particles which flows in a homogeneous and uniform fashion. This may be accomplished by feeding the particles onto a distributing surface surrounding the mass of fibers, which particles flow in a homogeneous and uniform fashion from the distributing surface in the form of a sheet which is subjected to the action of the gaseous currents. One of the features of the invention is that the particles move freely on the distributing surface in forming a natural flow.

When the fibers are produced by a rotary centrifuge, of the type well known in the art, the attenuated fibers gravitate in the form of a torus-shaped mass having a rotary movement. In this case, the particles may be projected into the mass of fibers by imparting a rotary movement to the annular sheet of granules which has a component in a direction opposite to the direction of rotary movement of the mass of fibers.

Also, the apparatus in accordance with the invention comprises a distributing member in the form of a crown surrounding the mass of fibers with elements which supply the particles onto the crown in the form of threads or streams. The crown has an inclination or slope at least equal to the slope of collapse or the "angle of repose" of the granules so that the several streams form sheets, which, by virtue of the positioning of the points of supply of the particles, merge together at the rim of the distributor crown to form a continuous and homogeneous layer of uniform thickness, which is then projected onto the mass of fibers by the blowers.

In accordance with another feature of the invention, the elements which supply the particles onto the distributor crown are formed by conduits which communicate with an apparatus which feeds the particles through a plurality of orifices, beyond which, the thickness of the beds or layers of particles issuing from the several orifices, is maintained substantially the same.

In accordance with another feature of the invention, the apparatus supplying the particles may consist of parallel tubes fitted with screw conveyers which advance and circulate the particles and feed them in streams or layers of substantially constant and adjustable thickness beyond the orifices which supply the conduits. The latter are preferably in the form of sluices or channels. In order to permit the regulation of the passage of the particles which enter these conduits or sluices, members in the form of perforated masks may be applied around the supply tubes along the length thereof, which permit any desired adjustment of the orifices through which the particles pass.

In another embodiment of the invention, the apparatus for feeding the particles consists of a tube in the form of a torus, which is disposed adjacent to the inclined wall of the crown, and which contains openings through which the particles flow onto the inclined wall. A helical member is provided in the tube for conveying the particles therethrough.

Other objects and purposes of the invention will appear from the following description in conjunction with the accompanying drawings, which illustrate several non-limiting examples, and wherein

FIGS. 1 to 4 illustrate graphically the advantageous features of the instant invention.

Figure 1:
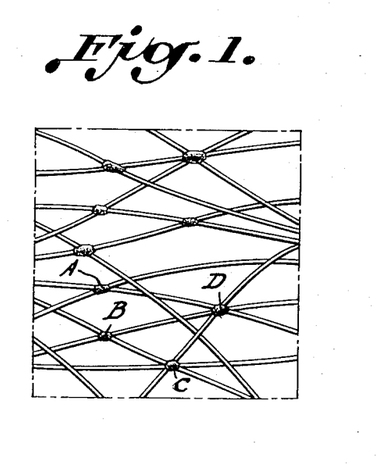
FIG. 1 is a view of a mass of interlocked mineral fibers, on a greatly enlarged scale, with binding agents incorporated therein.

FIG. 1 shows a part of a mass of mineral fibers 1 which, as is known, are joined together at cross-points by a binder. Four of these cross-points are marked A B C D. If this mass is subjected to a mechanical stress, such as, for example, compression, (FIG. 2), it is seen that the thickness of the mesh or lattice-work of fibers decreases, and that the quadrilateral A B C D is reduced to form quadrilateral A' B' C' D'.

Figure 2:
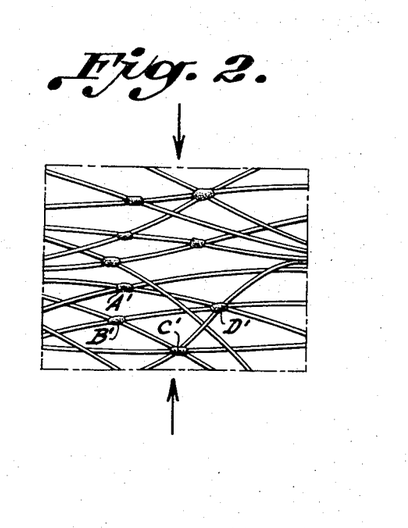
FIG. 2 is a view similar to FIG. 1, following the compression of the mass of fibers in a vertical direction.
Figure 3:
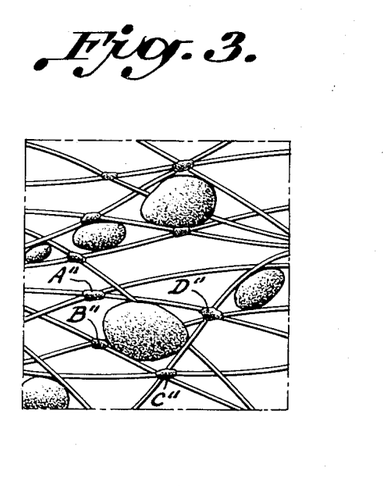
FIG. 3 is a view similar to FIG. 1 with the inclusion of separate hard and indeformable particles in the network of the mineral fibers, in accordance with the invention.
Figure 4:
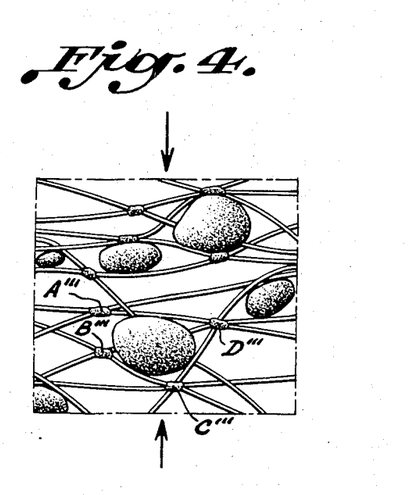
FIG. 4 is a view similar to FIG. 3 following the deformation of the mass of fibers by a compressive force of the same intensity as that employed on the mass shown in FIG. 2.

FIG. 3 shows the same fibrous structure as that shown in FIGS. 1 and 2, but one in which hard, whole and indeformable particles or granules 2 are introduced and interlocked between the meshes of the network of fibers. The preceding cross-points are marked A" B" C" D" and occupy substantially the same relative positions as the cross-points indicated in FIG. 1. If the mass is subjected to the same compressive stress as that imposed on the unit shown in FIG. 2, the resulting product is illustrated in FIG. 4. It is seen that the presence of each particle prevents deformation of the mesh in which it is enclosed, the points A''' B''' C''' D''' remaining in the same positions as points A" B" C" D", and that the assembly itself undergoes a decrease in thickness of much less extent than that in the case illustrated in FIG. 2.

Figure 5:
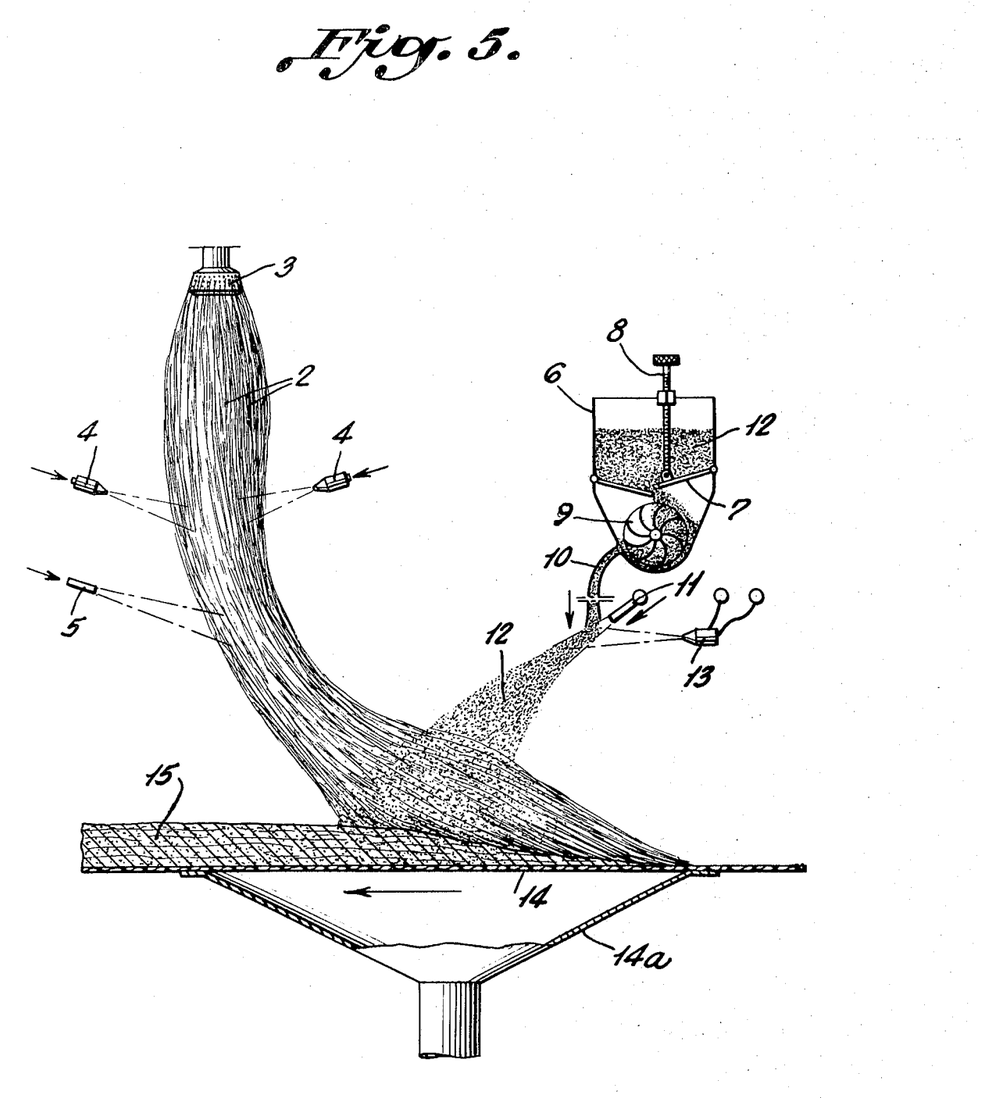
FIG. 5 is a front elevation, with certain parts in section, of an apparatus for executing the invention.

FIG. 5 illustrates one embodiment of an apparatus for obtaining a fibrous mass according to the invention as shown in FIGS. 3 and 4.

Fibers 2, for example glass fibers, are produced by a machine 3, which may be a centrifuge body rotating at high speed and having a peripheral wall provided with orifices through which are projected by centrifugal force threads of material which are attenuated into fibers in a manner well known in the art. Spray guns 4 project a binding agent onto the mass of fibers and a nozzle 5 directs a jet of air onto said mass, to direct it toward the zone where hard granules or particles 12 are introduced. The particles are contained in a receptacle 6, whose bottom is provided with ledges or movable shutters 7 with a feed regulator device 8. The particles issuing from the receptacle pass into a rotating drum 9 which insures a regular outflow of the particles wherefrom they flow by gravity through conduit 10. One or several nozzles 11 project a jet of air under pressure onto the particles in order to direct them toward the mass of fibers. A homogeneous spatial distribution of all the particles within the mass of fibers is assured by controlling the strength and direction of the air jet.

Spray guns 13 may project a binder onto the surfaces of particles before they are introduced into the mass of fibers.

The mass of fibers with the particles incorporated therein then passes onto an endless cloth band or other air-permeable conveyor 14, under which is arranged a suction casing 14a to form a pad or mat 15 of the desired thickness. The passage of this pad into an oven results in polymerization and hardening of the binder and cohesion of the interengaging fibers of the mat at their points of crossing contacts.

Figure 6:
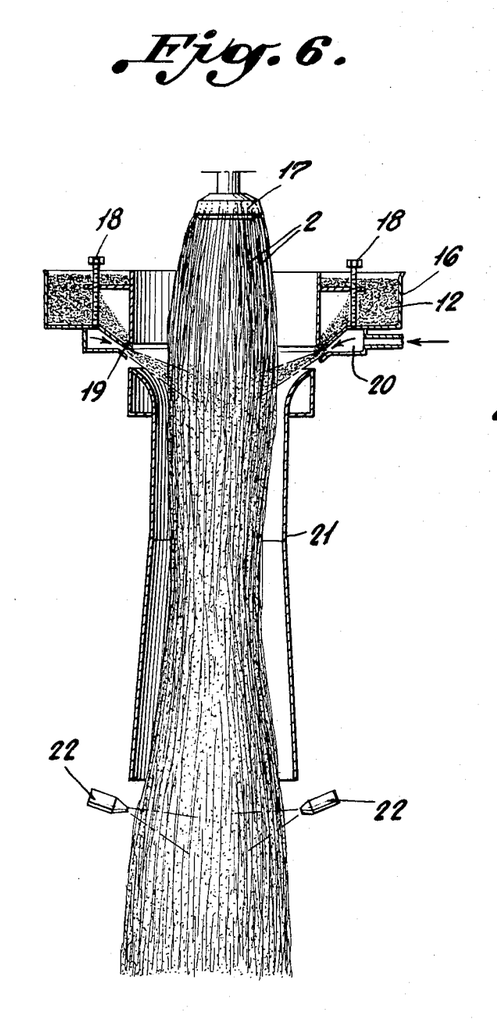
FIG. 6 is a sectional view, with certain parts in elevation, of a second embodiment of an apparatus in accordance with the invention.
Figure 7:
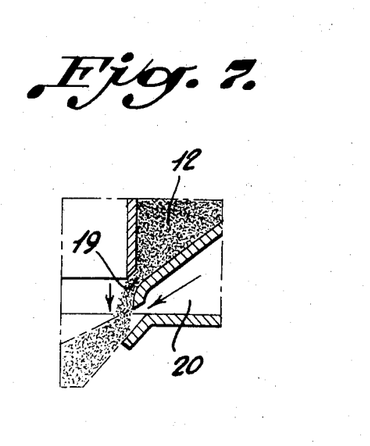
FIG. 7 is a partial view of FIG. 6, on an enlarged scale, at the outlet of the receptacle and blower for the hard particles.

In the embodiment shown in FIGS. 6 and 7, particles 12 are distributed from an annular container 16 arranged coaxially with respect to the mass of fibers 2 issuing from a centrifuge 17. The outflow of these particles is controlled by regulating elements 18. The particles flowing from annular orifice 19 of the distributor are subjected to the action of a circular blower 20 which assures their homogeneous spatial distribution in the entire mass of fibers.

An annular conduit or tuyere 21 is disposed below the circular blower 20 through which the mass of fibers passes, and an oscillating movement is imparted to the former. The moving conduit 21 makes possible a regular distribution of fibers on the endless air-permeable conveyor 14 for the purpose of forming the mat thereon.

In this embodiment the binder is introduced into the combined mass of fibers and granules by means of spray guns 22.

Figure 8:
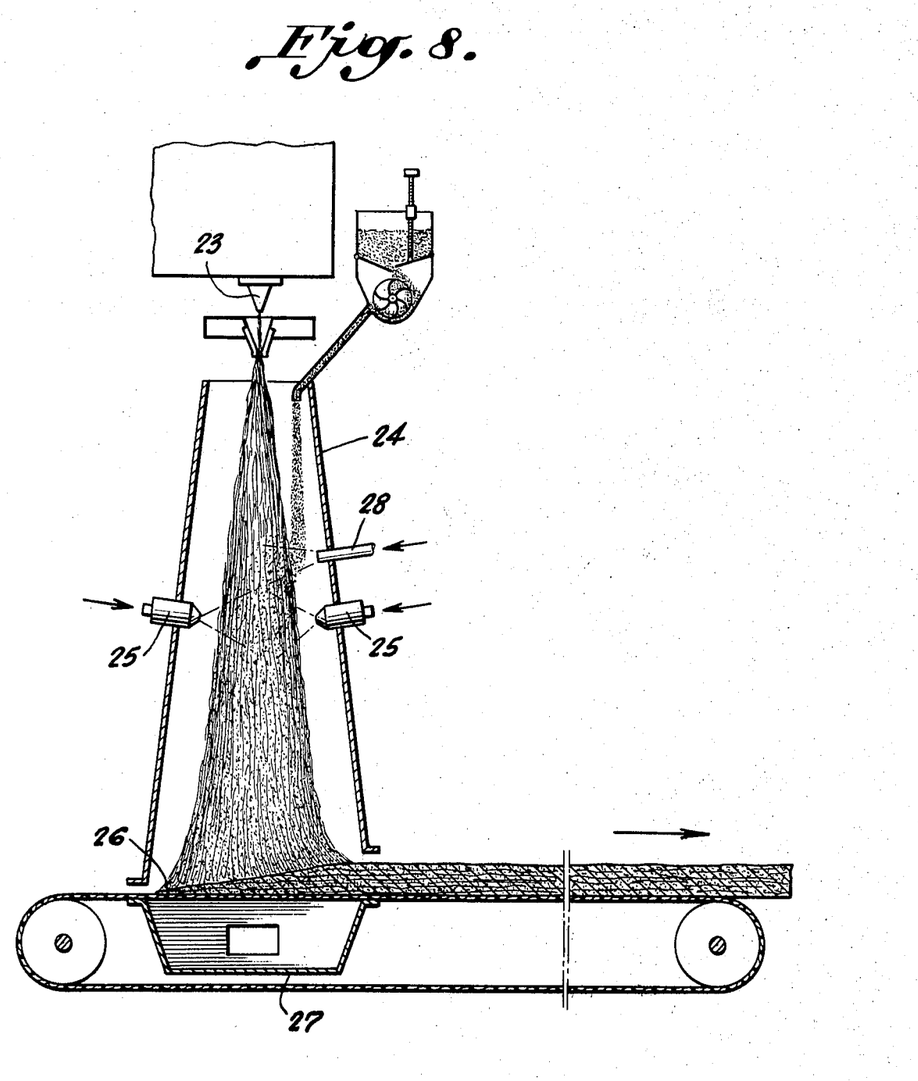
FIG. 8 is a front elevation of another embodiment of the invention, illustrating the incorporation of the granules within the mass of fibers issuing from a different form of fiber-producing apparatus.
Figure 9:
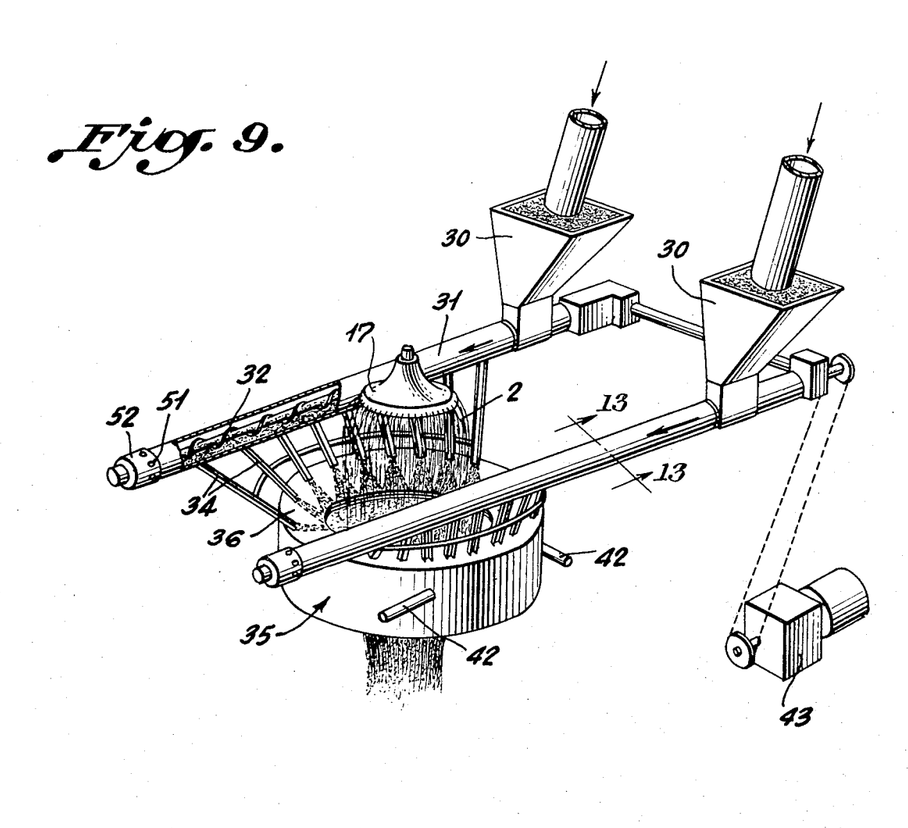
FIG. 9 is a perspective view of still another embodiment of the invention.
Figure 10:
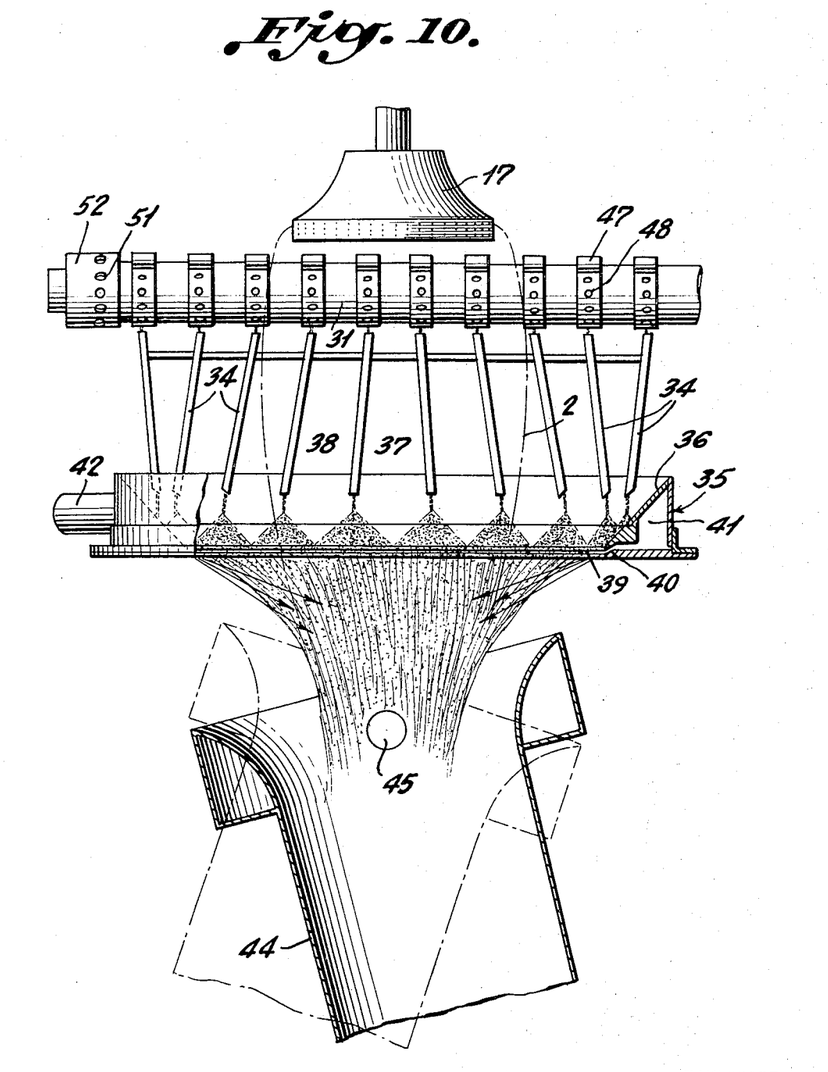
FIG. 10 is a vertical sectional view through the installation shown in FIG. 9, with certain parts in elevation.

In the embodiment shown in FIG. 8, the fibers are produced by drawing out the molten glass threads flowing from fixed spinning orifices 23. These threads, transformed into fibers, are directed to the interior of hood or funnel 24 and are impregnated with a binding agent by means of spray guns 25 before dropping onto endless conveyor member 26, under which is disposed the suction casing 27.

The solid indeformable particles issing from an apparatus, such as shown in FIG. 5, are led to the interior of the hood 24 where they drop in a free fall in order to be distributed in the mass of fibers by means of a gas current issuing from one or several nozzles 28.

In the embodiments shown in FIGS. 9 to 17, the apparatus for the production of the glass fibers 2 is indicated at 17, and is similar to that shown generally in FIG. 6. This apparatus 17 consists of a rotatable centrifuge operating at high speed with a peripheral wall having a plurality of orifices through which are projected the molten filaments of glass which are attenuated into the form of fibers.

In the apparatus shown in FIGS. 9 to 15, the solid particles, for example sand, which are introduced into the mass of fibers, are supplied by two hoppers 30 from which they flow into a pair of tubular conduits 31. A conveyor screw 32 is provided in each of the conduits, the diameter of which is less than the internal diameter of the conduits. The two screws 32 are maintained in synchronism by means of a motorreducer drive assembly 43.

The tubular conduits 31 have orifices 33 (FIG. 13) disposed along the lowermost portions of their cylindrical surfaces and through which flow the particles which are conveyed by the screws 32. A sluice or conduit 34 is disposed opposite each orifice 33. The particles flow along the length of each conduit and are discharged in the form of jets onto the distributor crown 35. This crown is disposed coaxially with the rotary centrifuge 17 and presents an oblique wall 36 towards the interior, the slope of which is at least equal to the "angle of repose" of the granules or particles.

The conduits or channels 34 are so disposed that the zones of impact 37 of the particles on the oblique wall 36 of the crown 35 are such that the particles flow freely on this wall, forming sheets 38 which spread out and re-unite along the length of the lower edge of the wall 36, (FIG. 12), thus forming a homogeneous and continuous sheet. The gaseous jet issuing from the annular orifice 40, provided at the base of the distributor 35 with the annular chamber 41, acts on this annular sheet of granules. The gas is introduced into this chamber through conduits 42 which are disposed obliquely in such a fashion that the particles are projected into the mass of fibers in the opposite rotary direction from that of the rotating mass of fibers.

The mass of fibers in which the particles are thus distributed in homogeneous fashion then passes into a conduit or tuyere 44 which executes an oscillating movement about a horizontal axis 45, thereby permitting a uniform distribution of the fibers onto a receiving web below it, on which is formed a mat, these fibers having been impregnated previously with a binder by means of spray guns, as shown in the arrangements described above.

Figure 11:
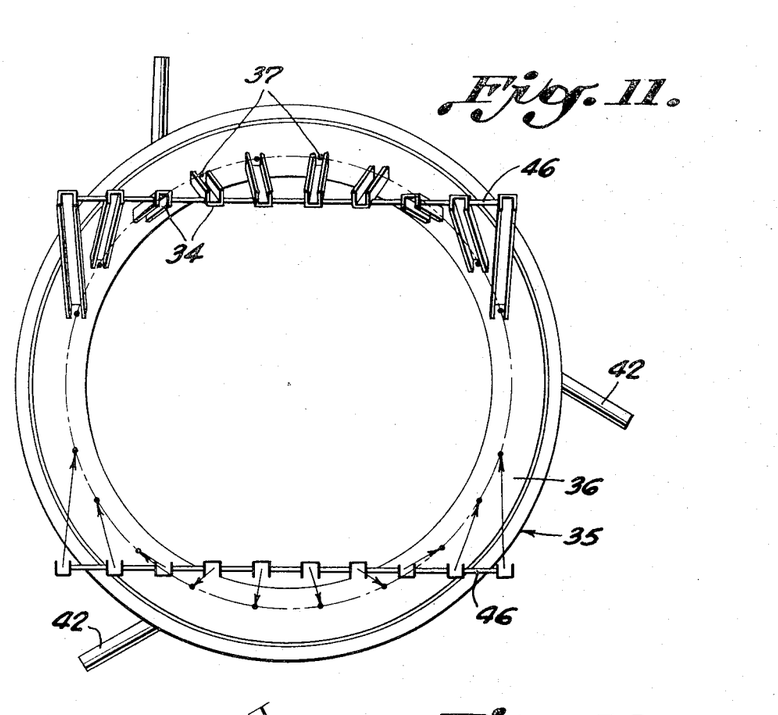
FIG. 11 is a diagrammatic plan view of the distributor shown in FIGS. 9 and 10, and indicating schematically the disposition of the conduits or sluices for feeding the hard particles thereto.
Figure 12:
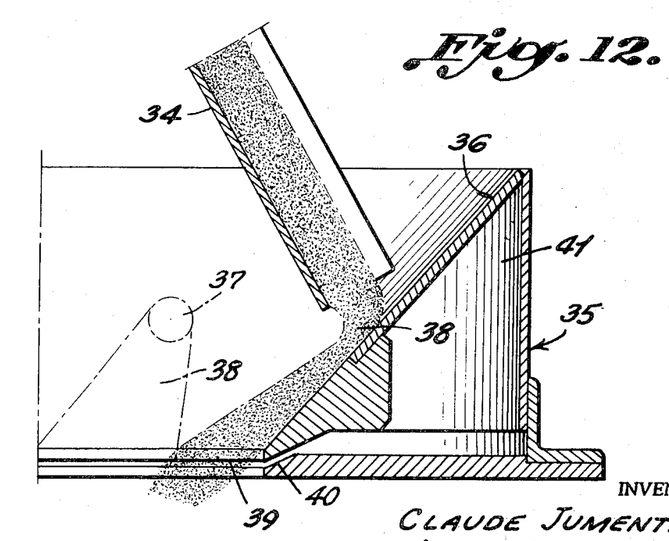
FIG. 12 is a vertical sectional view of a portion of the distributor crown at the outlet end of the supply conduits, illustrating the flow of the particles onto the distributor surface.

FIG. 11 shows the disposition of the conduits or channels 34, the inclinations of which are adjusted in a manner that their slope permits the natural flow of the particles, (a slope of at least 30° in the case of sand), and the directions of which are such that the zones of impact lead to the obtention of a continuous and homogeneous sheet, as described above and as shown in FIG. 12. These troughs are mounted on supports 46 disposed above the distributor crown in a fashion to minimize the obstruction of the apparatus.

Figures 13, 14, 15, 17:
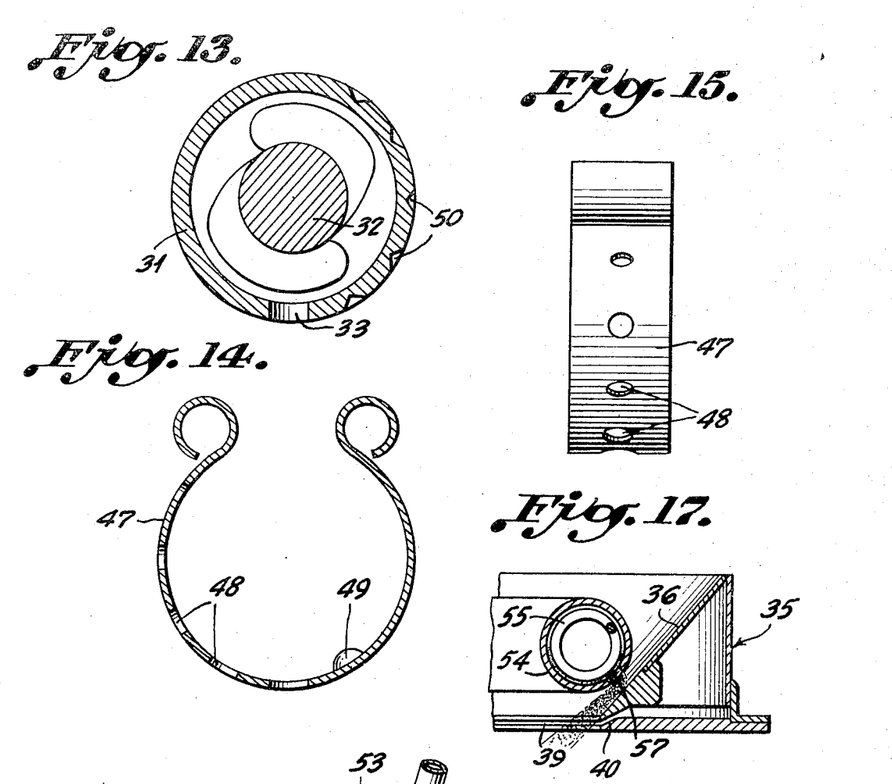
FIG. 13 is a vertical sectional view along line 13—13 of FIG. 9.
FIG. 14 is a sectional view of one of the perforated masks which are mounted along the supply tubes shown in FIGS. 9 and 10.
FIG. 15 is a side view of the mask shown in FIG. 14.
FIG. 17 is a sectional view along line 17—17 of FIG. 16.

The disposition of the conveying screws 32 and their rotary speed are such that a stream of particles of substantially uniform thickness is obtained below the assembly of outlet orifices 33 of tubular conduits 31. However, to obtain the proper delivery from each channel 34, which is fed from each of the orifices, masks 47, having openings 48 of different diameters, are resiliently mounted on the tubular conduits 31 in overlying relation to openings 33 therein. These masks of springy material may be turned to place an orifice of predetermined size opposite each outlet opening 33 of the tubular conduit according to the rate of discharge sought to be attained. An abutment or lug 49 is provided on the inside of each mask for selective cooperation with one of a plurality of grooves or notches 50 on the periphery of the conduits 31, which permits placing the apertured mask in correctly aligned position for any selected opening 48 in the latter.

In order to permit the evacuation of any excess particles or granules and to avoid jamming or choking of the conduits 31, the end 52 of each conduit is provided with openings 51 which permits the elimination of these excess particles.

The quantity of granules or particles discharged from the distributor is a function of the diameter of the holes 48 in the masks and the speed of rotation of the feed screws 32, the latter being adjusted for all the holes, with the exception of the openings 51 which are effective only when the conduits are too full. The latter serve to discharge particles only when the holes 33 and 48 become obstructed or when there is a strained operation, thereby avoiding a breakage of the feed screws.

Figure 16:
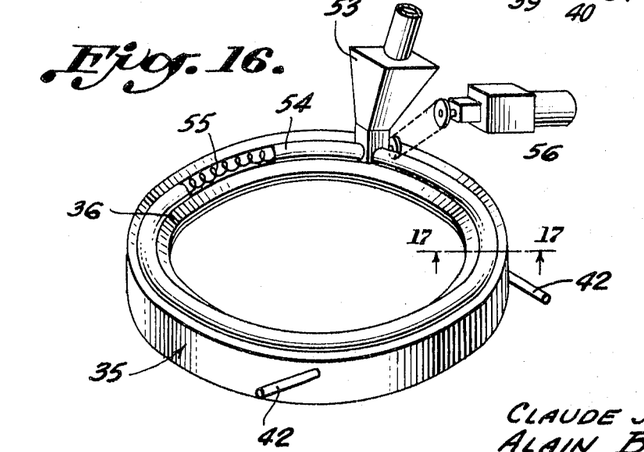
FIG. 16 is a perspective view of another embodiment of the invention.

In the modified embodiment shown in FIGS. 16 and 17, the particles are fed from a hopper 53 into an annular conduit 54 arranged in the form of a torus, in which operates a helical core-less feed member 55 which is rotated by a motor-reducer device 56. This conduit is disposed coaxially with the rotary centrifuge adjacent to the inclined wall 36 of the distributor crown 35, which operates in the same manner as described above in conjunction with FIGS. 9 to 15. The conduit 54 is provided with orifices 57, (FIG. 17), through which the particles flow onto the wall 36 for forming a continuous sheet of uniform thickness at the internal rim 39 of the distributor crown.

Any suitable polymerizable resins may be used as binding agents, examples of which are set forth below. Furthermore, variations may be made in the details of the apparatus, for example, in the character of the air-permeable conveyor for receiving the mass of fibers combined with a resin binder and hard particles distributed therethrough. As set forth above, the latter may be in the form of hard solid and indeformable granules, such as sand, or these granules may be hard and indeformable with voids therein such as foamed or porous granules of perlite or vermiculite. The invention also contemplates the use of hard and indeformable light particles which are interlocked in the meshes of the fibrous network, such as crushed, foamed or porous glass.

Below are given examples of products of glass fibers according to the invention as well as comparative data, between these products and the same products which do not include hard and separate unitary solid or foamed indeformable particles, from the point of view of heat-insulating capability and resistance to deformation.

EXAMPLE I a. Composition of glass

| | |
|---|---|
| $SiO_2$ | 66.3% |
| $Al_2O_3$ | 3.0% |
| $F_2O_3$ | 0.4% |
| $CaO$ | 7.6% |
| $MgO$ | 3.4% |
| $Na_2O$ | 14.0% |
| $K_2O$ | 1.1% |
| $B_2O_3$ | 1.5% |
| $BaO$ | 2.0% |
| $F_2$ | 0.8% | b. Mean diameter of Fibers: 6 microns
c. Nature of binder: Phenol formaldehyde resin
d. Nature of particles: Sand
e. Mean diameter of grains: 0.2 mm.

EXAMPLE I—Continued

| Product | Composition of Product | | Coefficient of thermal conductivity | Load required to reduce thickness of product by 25% |
|---|---|---|---|---|
| Product without sand | Fibers: Resin: | 38 Kg/m³* 2 Kg/m³ | 28.7 Kcal/mλ°C | 470 Kg/m² |
| Product with sand | Fibers: Resin: Sand: | 38 Kg/m³ 2 Kg/m³ 60 Kg/m³ | 30.2 Kcal/mλ°C | 880 Kg/m² |

\* Kg/m³ is abbreviation for Kg. per cubic meter.
\*\* Kg/m² is abbreviation for Kg. per square meter.

It is to be noted that while the products have substantially the same insulating power, the load necessary to obtain the same reduction in thickness in the product in accordance with the invention is nearly double.

EXAMPLE II a. Composition of the glass
b. Mean diameter of the fibers
c. Nature of the binder          } Identical with those of Example I
d. Nature of the granules or particles
e. Mean diameter of the granules

| Product | Composition of Product | | Coefficient of thermal conductivity | Load required to reduce thickness of product by 25% |
|---|---|---|---|---|
| Product without sand | Fibers: Resin: | 54.5 Kg/m³ 5.5 Kg/m³ | 28.0 Kcal/mλ°C | 1510 Kg/m² |
| Product with sand | Fibers: Resin: Sand: | 54.5 Kg/m³ 5.5 Kg/m³ 90 Kg/m³ | 31.0 Kcal/mλ°C | 2300 Kg/m² |

EXAMPLE III a. Composition of the glass
| | |
|---|---|
| $BiO_2$ | 61.3% |
| $Al_2O_3$ | 5.5% |
| $F_2O_3$ | 0.6% |
| CaO | 7.3% |
| MgO | 3.1% |
| $Na_2O$ | 13.9% |
| $K_2O$ | 1.9% |
| $B_2O_3$ | 2.9% |
| BaO | 3.2% | b. Mean diameter of the fibers: 12 microns
c. Nature of binder: Phenol formaldehyde resin
d. Nature of granules: Band
e. Mean diameter of granules: 0.2 mm.

| Product | Composition of product | | Load required to reduce thickness of product by 25% |
|---|---|---|---|
| Product without sand | Fibers: Resin: | 99 Kg/m³ 11 Kg/m³ | 9000 Kg/m² |
| Product with sand | Fibers: Resin: Sand: | 99 Kg/m³ 11 Kg/m³ 90 Kg/m³ | 16000 Kg/m² |

Set forth below are two examples of products of glass fibers with perlite and vermiculite, according to the invention, these examples showing, comparatively, the difference from the point of view of insulating value and resistance to deformation between these products and the same products which do not include these particles.

EXAMPLE IV a. Composition of glass:
| | |
|---|---|
| $BiO_2$ | 69.0% |
| $Al_2O_3$ | 2.3% |
| $F_2O_3$ | 0.4% |
| CaO | 9.0% |
| MgO | 2.9% |
| $Na_2O$ | 13.5% |
| $K_2O$ | 0.2% |
| $B_2O_3$ | 1.7% |
| $F_2$ | 0.5% | b. Mean diameter of fibers: 6 microns
c. Nature of binder: Phenol formaldehyde resin
d. Nature of grains: Perlite
e. Diameter of grains: 0.1 mm. to 2 mm.

EXAMPLE IV — Continued

| Product | Composition of product | | Coefficient of thermal conductivity | Load required to reduce thickness of product by 25% |
|---|---|---|---|---|
| Product without perlite | Fibers:<br>Resin: | 36 Kg/m³<br>4 Kg/m³ | 28.7 Kcal/mλ°C | 800 Kg/m² |
| Product with perlite | Fibers:<br>Resin:<br>Perlite: | 36 Kg/m³<br>4 Kg/m³<br>18 Kg/m³ | 30.0 Kcal/mλ°C | 2200 Kg/m² |

It is to be noted that while both products have substantially the same insulating capacity, the load required to attain the same reduction in thickness is nearly tripled for the product in accordance with the instant invention.

EXAMPLE V a. Composition of glass  
b. Mean diameter of fibers  } Identical to those of Example IV  
c. Nature of binder  
d. Nature of grains: Vermiculite  
e. Diameter of grains: from 3 mm. to 6 mm.

| Product | Composition of product | | Coefficient of thermal conductivity | Load required to reduce thickness of product by 25% |
|---|---|---|---|---|
| Product without vermiculite | Fibers:<br>Resin: | 36 Kg/m³<br>4 Kg/m³ | 28.7 Kcal/mλ°C | 800 Kg/m² |
| Product with vermiculite | Fibers:<br>Resin:<br>Vermiculite: | 36 Kg/m³<br>4 Kg/m³<br>10 Kg/m³ | 29.5 Kcal/mλ°C | 1400 Kg/m² |

We claim:

1. An apparatus for producing structural mats of mineral fibers comprising
   a. a rotary centrifuge disposed on a vertical axis for producing an annular curtain of attenuated glass fibers from molten glass,
   b. an air-permeable traveling conveyor for the freshly formed curtain of glass fibers below said centrifuge,
   c. annular means below said centrifuge surrounding the annular curtain of fibers for supplying hard and indeformable particles to flow by gravity in a continuous annular sheet around said curtain of fibers,
   d. means including an annular blowing device directed toward said curtain of fibers for introducing the particles flowing by gravity into the annular curtain of fibers in the course of its travel to said conveyor to effect a homogeneous distribution of the particles therein,
   e. additional means below said centrifuge and annular means for coating said fibers and particles with a binder, and
   f. a suction casing below said conveyor for reducing the volume of the combined mass of fibers with the binder and hard particles interspersed therethrough, following the deposition thereof on said conveyor for subsequent hardening thereof.

2. An apparatus as set forth in claim 1, wherein said first-mentioned annular means comprises an annular receptacle for the particles below said centrifuge, surrounding said annular curtain of fibers and provided with an adjustable outlet at the bottom of said receptacle, and adjacent to said annular blowing device for projecting the particles into said annular curtain of fibers.

3. An apparatus as set forth in claim 2, including an oscillating conduit between said receptacle and conveyor for depositing said curtain of fibers onto the latter.

4. An apparatus as set forth in claim 3, wherein said coating means is disposed below said oscillating conduit and above said conveyor.

5. An apparatus as set forth in claim 1, wherein said first-mentioned annular means comprises
   a. a distributor crown below said centrifuge and surrounding said annular curtain of fibers,
   b. an annular inclined wall on the interior of said crown having a slope at least as great as the "angle of repose" of the particles,
   c. means for feeding a plurality of streams of the particles onto said wall around the circumference thereof, which merge into a continuous sheet at the lower edge thereof, and
   d. said annular blowing device being disposed at the bottom of said distributor crown for blowing said continuous sheet of particles into said annular curtain of fibers.

6. An apparatus as set forth in claim 5, wherein said last-mentioned annular blowing device is provided with tangentially disposed inlets to impart a rotary movement to the annular sheet of particles in a direction opposite to the rotary movement of the annular curtain of fibers falling from the rotary centrifuge.

7. An apparatus as set forth in claim 5, including means for adjusting the feed of the plurality of streams to render them uniform around the circumference of said inclined wall.

8. An apparatus as set forth in claim 5, wherein said feeding means comprises
   a. a pair of conveyor tubes disposed above said distributor crown each provided with a plurality of openings along the lowermost portions thereof,
   b. means for supplying the hard particles to one end of each of said tubes,
   c. a screw conveyor in each tube, and
   d. conduits extending from each of said openings to spaced points around the circumference of said inclined wall.

9. An apparatus as set forth in claim 8, including adjustable masks provided with a plurality of apertures of different sizes adapted to selectively overlie each opening in said tubes to control the thickness of the streams of particles which are fed to said inclined wall.

10. An apparatus as set forth in claim 9, wherein each of said conveyor tubes is provided with relief openings at the end thereof remote from its end of supply.

11. An apparatus as set forth in claim 5, wherein said feeding means comprises a toroidal-shaped conveyor tube adjacent to said inclined wall, and provided with a plurality of openings therealong for discharging the plurality of streams of particles thereonto, a helical core-less conveyor in the interior of said tube, and means for supplying the hard particles connected to one end thereof.

12. An apparatus as set forth in claim 5, including an oscillating tuyers between said distributor crown and traveling conveyor for smoothly depositing said annular curtain of fibers on the latter.

* * * * *